(12) United States Patent
Kamoda et al.

(10) Patent No.: US 7,532,247 B2
(45) Date of Patent: May 12, 2009

(54) IMAGE PICKUP APPARATUS (75) Inventors: Masaaki Kamoda, Saitama (JP);
Toshimitsu Iwai, Saitama (JP); Kenichi Matsumoto, Shinagawa-ku (JP)

(73) Assignees: Tamron Co., Ltd., Saitama-shi, Saitama-ken (JP); Sony Corporation, Shinagawa-ku, Tokyo (JP)

( * ) Notice: Subject to any disclaimer, the term of this patent is extended or adjusted under 35 U.S.C. 154(b) by 846 days.

(21) Appl. No.: 10/958,342

(22) Filed: Oct. 6, 2004

(65) Prior Publication Data
US 2005/0073602 A1 Apr. 7, 2005

(30) Foreign Application Priority Data
Oct. 6, 2003 (JP) ............... 2003-347133

(51) Int. Cl.
*H04N 5/225* (2006.01)
(52) U.S. Cl. ...................... 348/373; 348/374
(58) Field of Classification Search ............... 348/374, 348/373, 335, 208.1; 257/433
See application file for complete search history.

(56) References Cited

U.S. PATENT DOCUMENTS

| 4,734,778 | A | 3/1988 | Kobayashi et al. | |
| 6,351,288 | B1* | 2/2002 | Johnson et al. | 348/373 |
| 6,628,339 | B1* | 9/2003 | Ferland et al. | 348/374 |
| 6,665,016 | B2* | 12/2003 | Saitoh | 348/374 |
| 6,686,954 | B1* | 2/2004 | Kitaguchi et al. | 348/208.1 |
| 6,710,945 | B1* | 3/2004 | Miranda | 359/819 |

FOREIGN PATENT DOCUMENTS

| JP | 61 118707 | 6/1986 |
| JP | 08 248465 | 9/1996 |
| JP | 2002 244005 | 8/2002 |
| JP | 2002 296473 | 10/2002 |

OTHER PUBLICATIONS

Patent Abstracts of Japan, vol. 2003. No. 2, Feb. 5, 2003.
Patent Abstracts of Japan, vol. 010, No. 305 (P-507), Oct. 17, 1986.
Patent Abstracts of Japan, vol. 2002, No. 12 Dec. 12, 2002.
Patent Abstracts of Japan, vol. 1997, No. 01, Jan. 31, 1997.

* cited by examiner

*Primary Examiner*—Nhan T. Tran
*Assistant Examiner*—Mekonnen Dagnew
(74) *Attorney, Agent, or Firm*—Jacobson Holman PLLC (57) ABSTRACT

An image pickup apparatus which can precisely adjust the inclination of CCD sensor relative to an optical axis in a easy and simple manner is disclosed. A mount adjustment mechanism 200 includes a mount 202 for supporting a CCD sensor 130, a steel ball 218 secured relative to a rearward barrel 206 and threaded adjuster members 220, 222 disposed between the mount 202 and the rearward barrel 206. The steel ball 218 defines a mount reference for positioning the mount 204. By changing the depth to which the threaded adjuster members 220, 222 are threaded, an angular orientation of the mount 202 with respect to the rearward barrel 206 is changed to correct the inclination in the CCD sensor.

3 Claims, 13 Drawing Sheets

IMAGE PICKUP APPARATUS

BACKGROUND OF THE INVENTION

1. Field of the Invention

The present invention relates to an image pickup apparatus comprising a CCD type image sensor. More particularly, the present invention relates to a camera comprising a CCD type image sensor and a tilt adjustment mechanism for the image sensor.

2. Description of the Related Art

In a conventional image pickup apparatus, a CCD type image sensor is adhesively bonded to a CCD sheet metal. The CCD sheet metal with the CCD sensor bonded thereto is then threadedly attached to or adhesively bonded to the rearward end of a taking lens. The conventional image pickup apparatus also comprises a tilt adjustment mechanism for the image sensor which comprises a movable plate for positioning an image sensor, the movable plate being capable of tilting the image sensor about one end of a diagonal line within the effective range of image taking in a direction corresponding to an optical axis, a fixed or stationary plate for holding the movable plate, and adjusting screws for performing the adjustment of the movable plate in horizontal and vertical directions (e.g., see Japanese Patent Laid-Open Application No. HEISEI-8 (1996)-248465 (Pages 4 to 5, FIGS. 1 and 2)).

In the conventional general image pickup apparatus, the CCD image sensor is poor of its own precision. In this respect, the problem has arisen in that the positional precision in a focal plane required as an optical performance (which precision mainly relates to any inclination or misalignment of the CCD image sensor relative to the optical axis) cannot be ensured only by threadedly attaching the CCD sheet metal with the CCD image sensor adhesively bonded thereto to the rearward end of the taking lens. In order to overcome such a problem, it is known to employ a method which uses a jig or the like to correct the inclination or misalignment of the CCD image sensor relative to the optical axis when the CCD image sensor is adhesively bonded to the CCD sheet metal or when the CCD metal plate with the CCD image sensor bonded thereto is assembled into the barrel of the image taking lens. In such procedures process, however, the CCD image sensor must be finely adjusted and positioned after the inclination or misalignment of the CCD image sensor relative to the optical axis is detected. Thus, this method requires a large-scaled facility used to adhesively bond the CCD image sensor to the CCD sheet metal, probably resulting in an increase of the initial investment. When the CCD image sensor is merely adhesively bonded to the CCD sheet metal, furthermore, it is likely to cause a misalignment or damage in the CCD image sensor due to vibration or impact.

The conventional image pickup apparatus may also comprise an image sensor tilt adjustment mechanism which adjusts the tilt or inclination in the CCD image sensor by operating adjusting screws from the side of eyepiece. Such an image-sensor tilt adjustment mechanism may make it difficult or probably impossible to adjust the CCD image sensor when the latter has been mounted in the image pickup apparatus or when a picturing jig has been in the image pickup apparatus.

It is an object of the present invention to realize an image pickup apparatus having an image-sensor tilt adjustment mechanism which can easily and simply adjust the tilt of a CCD image sensor relative to the optical axis in a precise and stable manner.

Another object of the present invention is to provide an image pickup apparatus having an image-sensor tilt adjustment mechanism which can hold a CCD image sensor in a more reliable manner.

A further object of the present invention is to realize a downsized image pickup apparatus and particularly a downsized rearward barrel.

SUMMARY OF THE INVENTION

The present invention provides an image pickup apparatus for pickup of an image of a subject that comprises a taking lens system for focusing a light beam from a subject, a taking lens barrel for supporting the taking lens system therein, an image sensor for receiving an image defined by the focused light beam passing through the taking lens stem, a mount for supporting said image sensor and a mount adjustment mechanism for adjusting a tilt or inclination of the mount in order to change an angular orientation of image sensor with respect to an optical axis of the taking lens system. The mount adjustment mechanism comprises a mount reference for positioning the mount in a direction parallel to the optical axis, and adjuster means disposed between the mount and the taking lens barrel and movable along a central axis which is not parallel to the optical axis. In such an arrangement, the tilt adjustment mechanism of the image pickup apparatus can adjust the tilt of the image sensor relative to the optical axis in a precise and stable manner.

In the image pickup apparatus of the present invention, at least of a portion of the mount reference preferably defines a spherical surface. Also, in the image pickup apparatus of the present invention, the mount preferably has an inclined surface thereon for contacting the movable adjuster means. In the image pickup apparatus of the present invention, it is also preferred that the adjuster means comprises two threaded members each movable along the central axis thereof which is perpendicular to the optical axis and that these two threaded members are lengthwise arranged to define a divergent angle about the optical axis, the divergent angle being in the range of 90 degrees to 150 degrees. In such an arrangement, the tilt of the image sensor relative to the optical axis in the image pickup apparatus can be adjusted easily and simply. Furthermore, the image pickup apparatus of the present invention preferably comprises a resilient member for urging the mount against the taking lens barrel. In such an arrangement, the image pickup apparatus can hold the image sensor with increased reliability.

ADVANTAGES OF THE INVENTION

In accordance with the present invention, the image-sensor tilt adjustment mechanism of the image pickup apparatus can precisely adjust the inclination of the image sensor relative to the optical axis in a stable manner. Also, in accordance with the present invention, the image-sensor tilt adjustment mechanism of the image pickup apparatus can also adjust the inclination of the image sensor relative to the optical axis more easily and simply. According to the present invention, the image-sensor tilt adjustment mechanism of the image pickup apparatus can further hold the image sensor with increased reliability. In accordance with the present invention, the image-sensor tilt adjustment mechanism of the image pickup apparatus can further facilitate the mounting of the image sensor itself since the latter does not require to be mounted on the lens barrel after the adjustment of the inclination of the image sensor. According to the present invention, further, the image-sensor tilt adjustment mechanism of the image pickup apparatus enables the rearward barrel position to be downsized. According to the present invention, still further, the manufacturing/adjusting process for the image pickup apparatus can be simplified since the image-sensor tilt adjustment mechanism can be adjusted by accessing it in a direction perpendicular to the optical axis.

DETAILED DESCRIPTION OF THE PREFERRED EMBODOMENTS

A preferred embodiment of the present invention will now be described with reference to the accompanying drawings. This embodiment according to the present invention relates to an image pickup apparatus in the form of a digital camera comprising an image sensor (i.e., CCD sensor). While the following description will relate to the camera utilizing a CCD sensor as the image sensor, the present invention can use any other type of image sensors such as CMOS in place of the CCD.

(1) General Structure of Camera

First of all, the general structure of a camera according to the embodiment of the present invention will be described. Referring to FIGS. 1 to 3 and FIG. 16, the camera 100 according to the present invention is in the form of a digital camera which comprises a camera body 110 for use in recording a light beam from a subject to be photographed and an image taking system 120 for taking the image of the subject. The image taking system 120 may be of a structure that is removably mounted on the camera body 110. The image taking system 120 defines an optical axis 122 and comprises a taking-lens optical system 124, a diaphragm 126, a shutter 127, a focusing mechanism 172 for moving part or the whole of the lenses in the taking-lens optical system 124 to focus an image defined by the light beam from the subject onto a focal plane, a shutter actuating mechanism 173 for actuating the shutter 127, and a diaphragm actuating mechanism 174 for actuating the diaphragm 126.

The camera body 110 includes a finder 112, a shutter button 114, one or more switches (five switches being shown in FIG. 3) 116, one or more dials 118 (two dials being shown in FIG. 3) and a flash lamp 119. The finder 112 can comprise a liquid crystal display (LCD). The camera body 110 also includes a CCD sensor 130 for receiving the image defined by the focused light beam from the subject passing through the taking-lens optical system 124, an integrated circuit (IC) 132 including a CPU for processing information relating to the light beam from the subject received by the CCD sensor 130 and a RAM card 134 for storing the information of the light beam from the subject that is processed by the CPU. The respective operations of the diaphragm actuating mechanism 174, shutter actuating mechanism 173, focusing mechanism 172 are controlled by the CPU in the IC 132. Alternatively, the RAM card 134 may be replaced by any one selected from a group consisting of a magnetic tape, a flexible disk, a CD-ROM, a CD-R, a CD-RW, a DVD-R, a DVD-RW, a DVD-RAM, a laser disk and a MO disk.

The IC 132 may include a CPU, a ROM, a RAM and the like. ROM, RAM and the like may be provided separately from the IC 132. It is preferred that the IC 132 is in the form of a PLA-IC including a program for executing various instructions. The camera body 110 is also provided with a crystal oscillator 136 for generating a reference signal and a battery 138 serving as a power source. According to this embodiment of the present invention, furthermore, external components such as resistances, capacitors, coils, diodes, transistors may be used with the IC 132, if necessary.

(2) Mount Adjustment Mechanism

Figure 1:
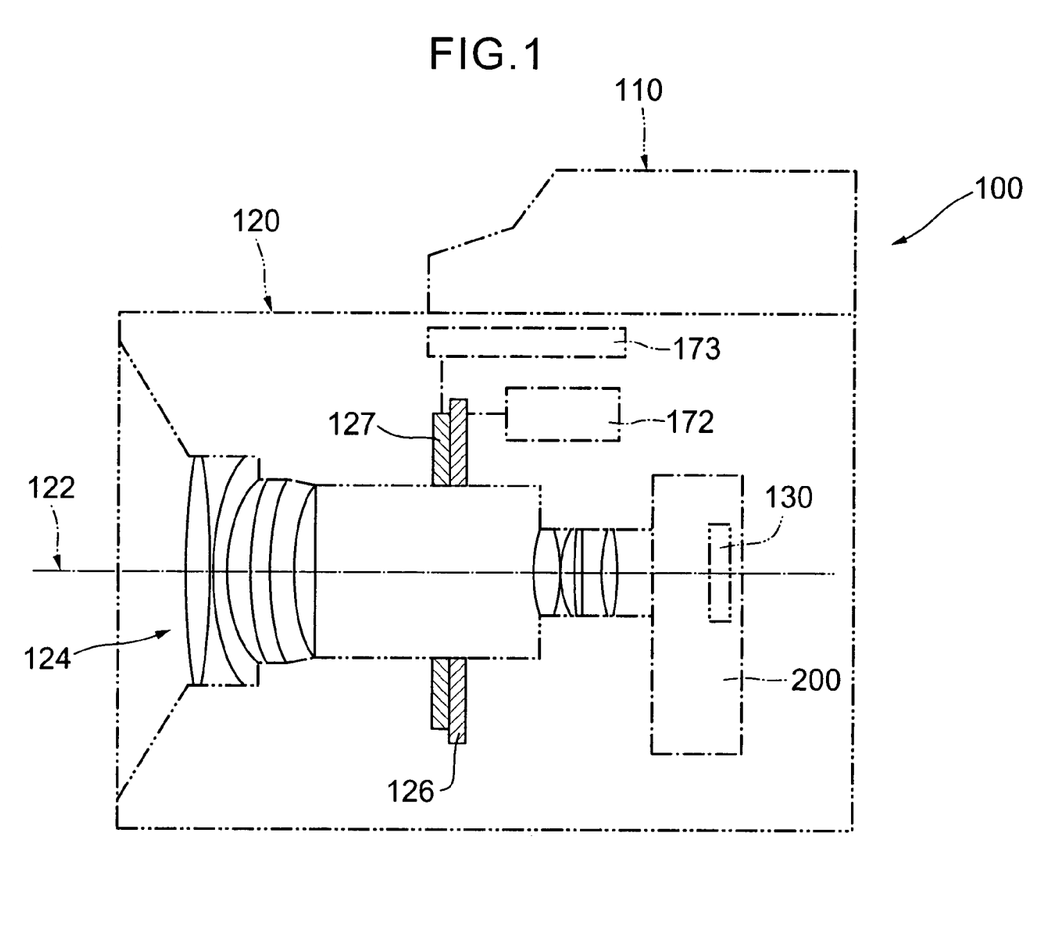
FIG. 1 is a fragmentary sectional view of a camera according to one embodiment of the present invention.
Figure 2:
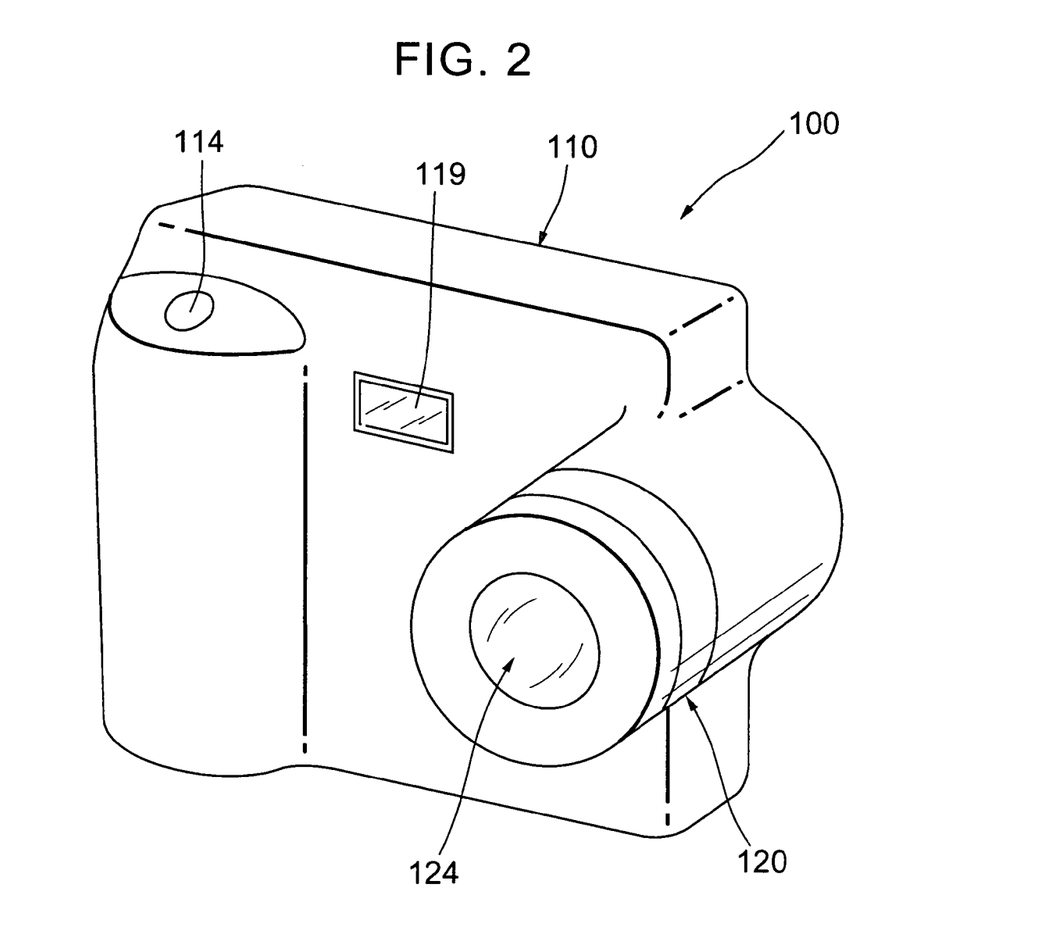
FIG. 2 is a perspective view of the camera shown in FIG. 1.
Figure 3:
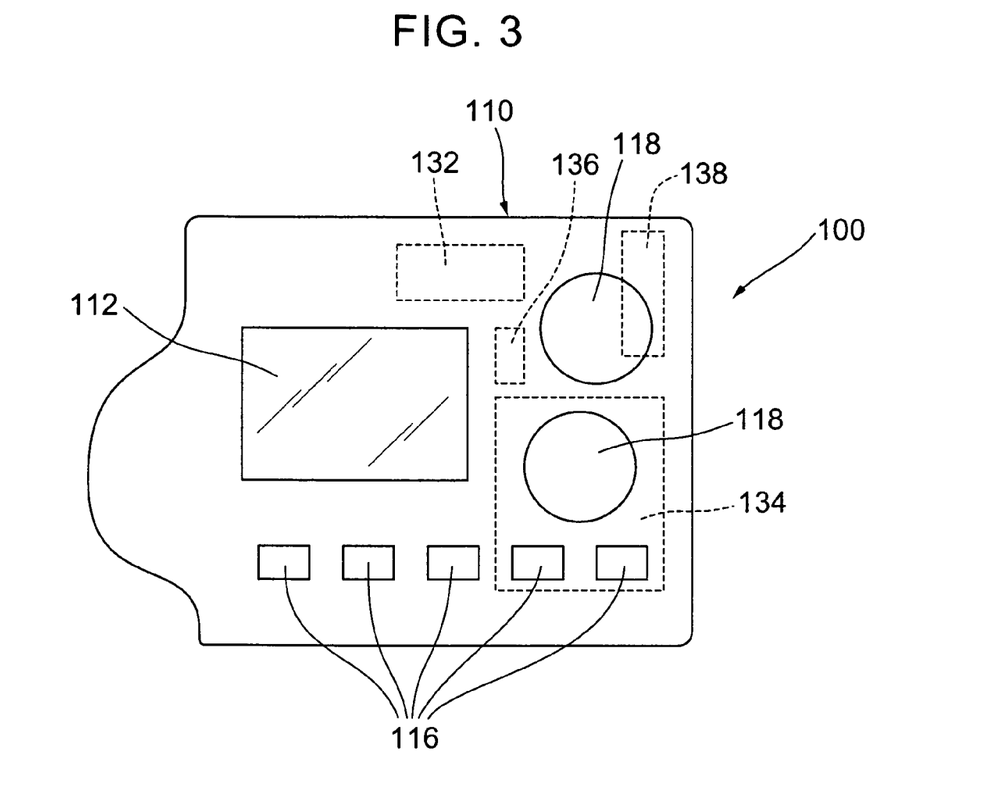
FIG. 3 is a rear view of the camera shown in FIGS. 1 and 2.
Figure 4:
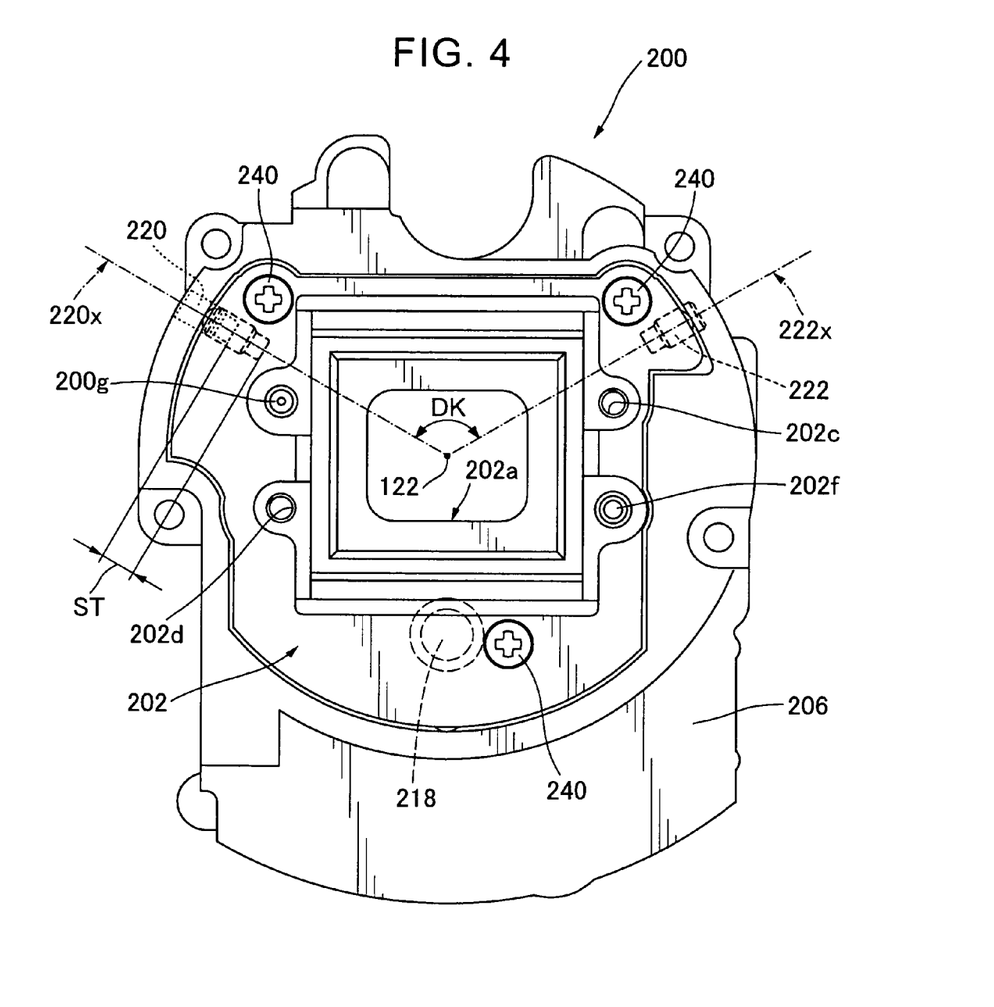
FIG. 4 is a front view of a mount adjustment mechanism in the camera according to the embodiment of the present invention.
Figure 5:
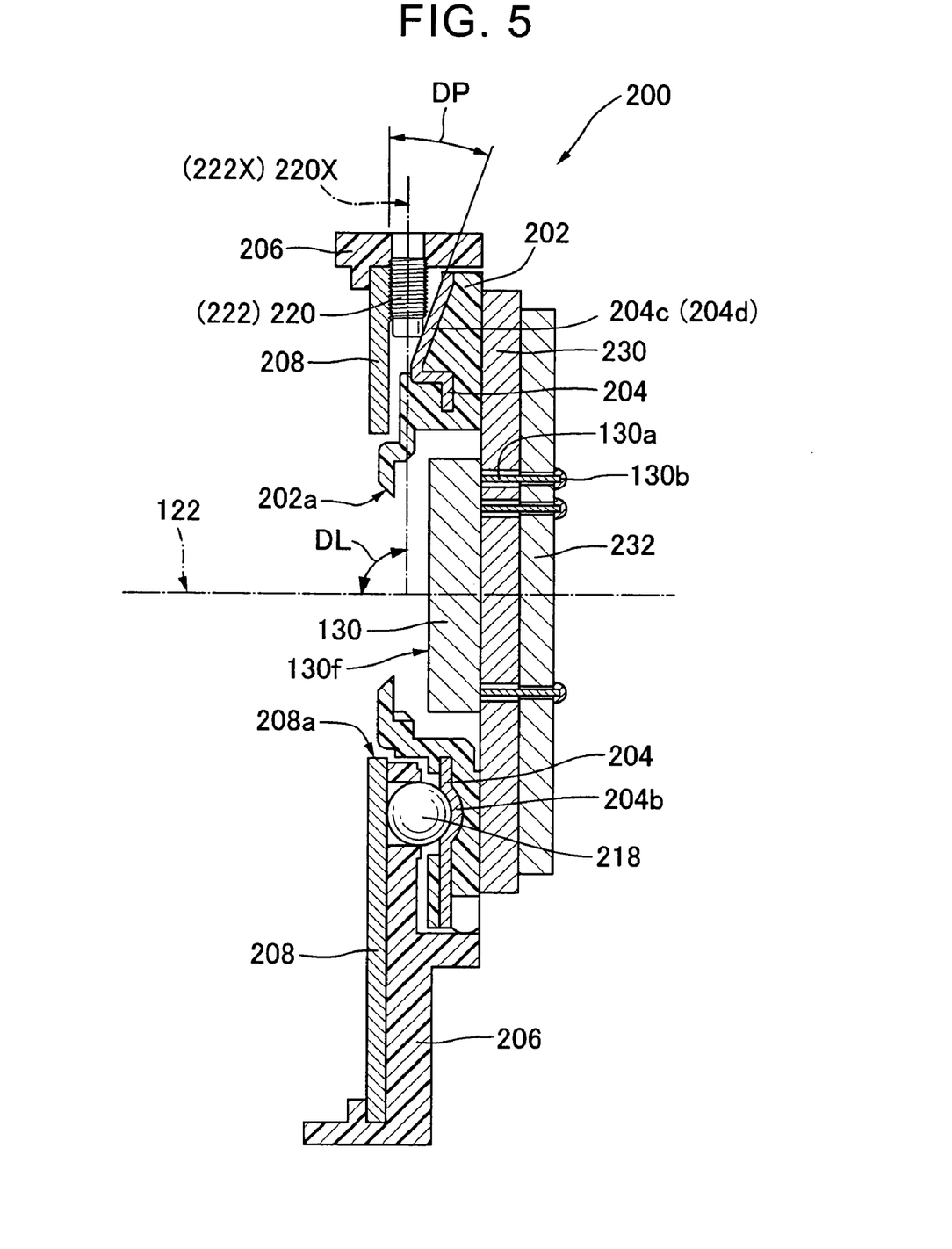
FIG. 5 is a fragmentary sectional view of the mount adjustment mechanism shown in FIG. 4, showing an image sensor mounted thereon.
Figure 6:
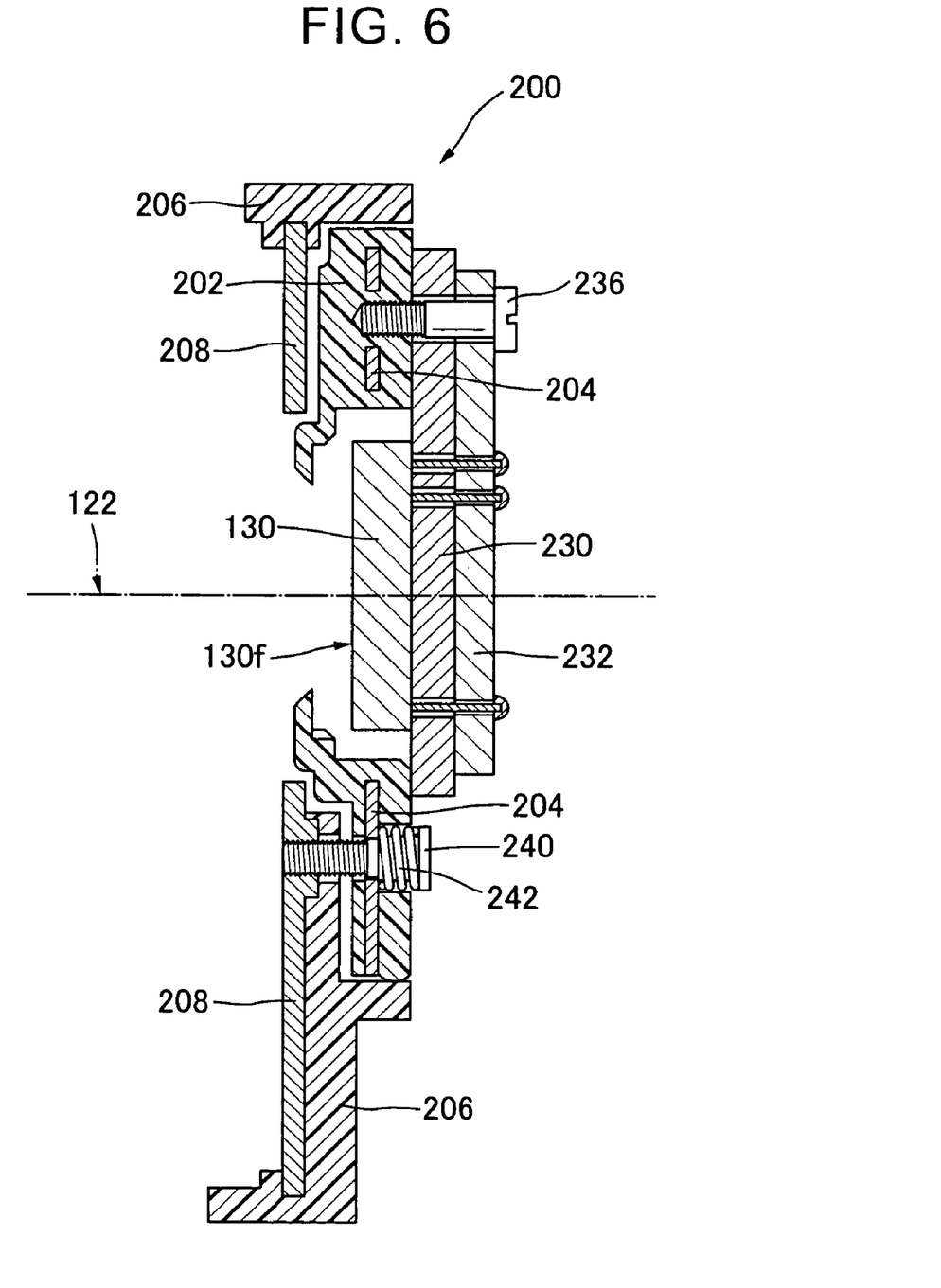
FIG. 6 is another fragmentary sectional view of the mount adjustment mechanism shown in FIGS. 4 and 5, also showing the image sensor mounted thereon.

The structure of a mount adjustment mechanism according to the embodiment of the present invention will be described below. Referring to FIGS. 4 to 6, the mount adjustment mechanism 200 is provided which can change an angular orientation of the image receiving portion in the CCD sensor 130 with respect to the optical axis 122 of the taking-lens optical system 124. The mount adjustment mechanism 200 comprises a mount 202 for supporting the CCD sensor 130, a rearward barrel 206, a steel ball 218 fixedly mounted on the mount 202 and movable adjuster means in the form of two threaded members 220, 222 disposed between the mount 202 and the rearward barrel 206. The rearward barrel 206 is located at a position rearwardmost of the taking lens barrel (i.e., a position farthermost from the subject in the taking lens barrel). The steel ball 218 defines a mount reference to be used in positioning the mount 202 in both the directions parallel and perpendicular to the optical axis 122. In other words, the mount reference is defined by a portion of the spherical surface of the steel ball 218. For example, the steel ball 218 may be in the form of a stainless steel ball for use with a ball bearing. Preferably, the steel ball 218 may be, for example, 3.4 mm in diameter. Alternatively, the steel ball 218 may be replaced by a metallic or plastic pin which has a hemispherical head and is fixedly mounted on the rearward barrel 206 or a hemispherical mount reference portion may be formed integrally with the rearward barrel 206, rather than the steel ball 218.

Referring now to FIG. 5, a support plate 230 is disposed in intimate contact with the backside of the CCD sensor 130 (i.e., the side of the CCD sensor 130 opposite to the image receiving side 130f thereof for receiving the light beam from the subject). For example, the support plate 230 may be formed of stainless steel. A CCD circuit board 232 for the CCD sensor 130 is disposed in intimate contact with the backside of the support plate 230 (i.e., the side of the support plate 230 opposite to the other side thereof on which the CCD sensor 130 is disposed). The CCD sensor 130 includes a plurality of terminals 130a which extend through apertures formed in the support plate 230 and CCD circuit board 232. The ends of the terminals 130a are soldered together to form a predetermined pattern in the CCD circuit board 232.

Figure 7:
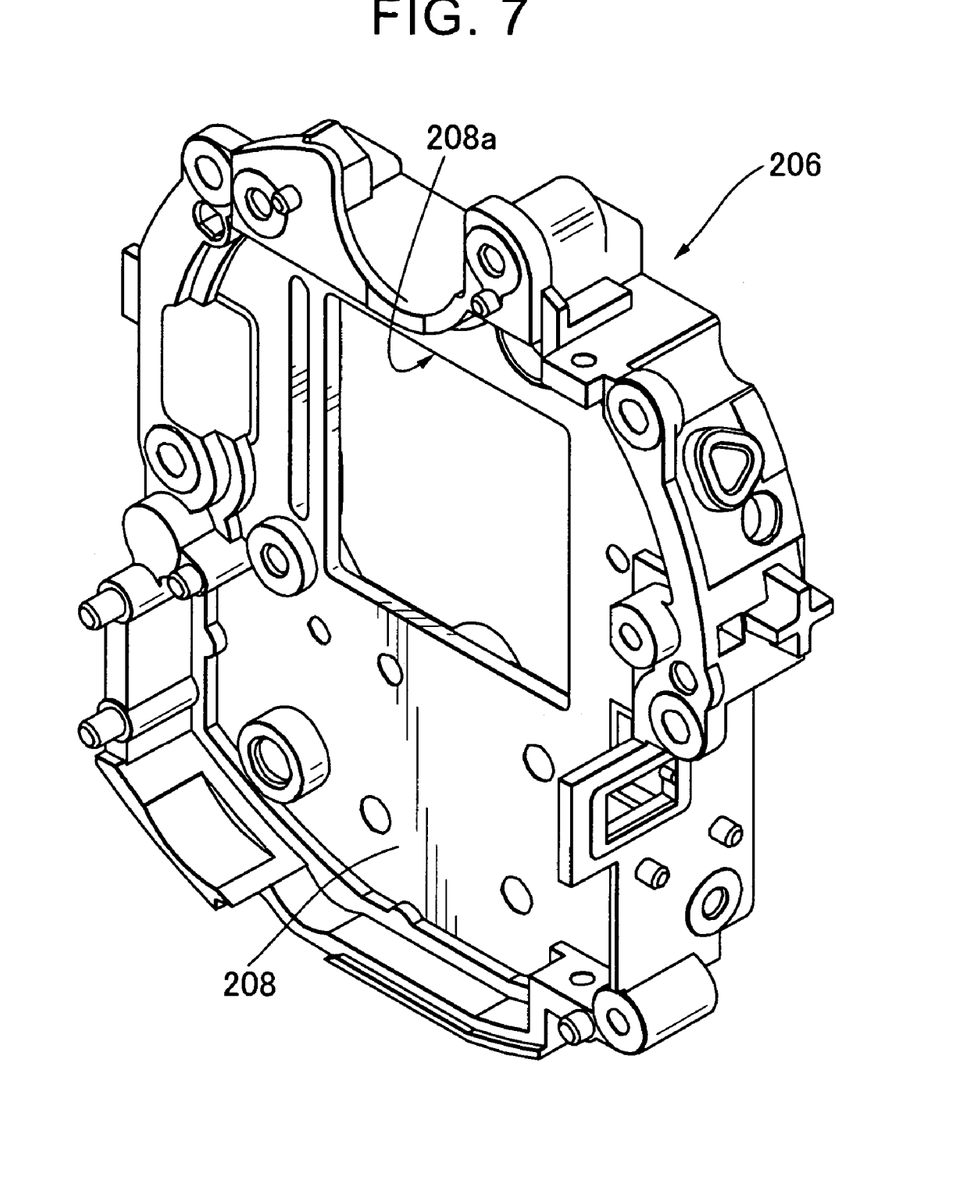
FIG. 7 is a perspective view of a rearward barrel in the camera according to the embodiment of the present invention.
Figure 8:
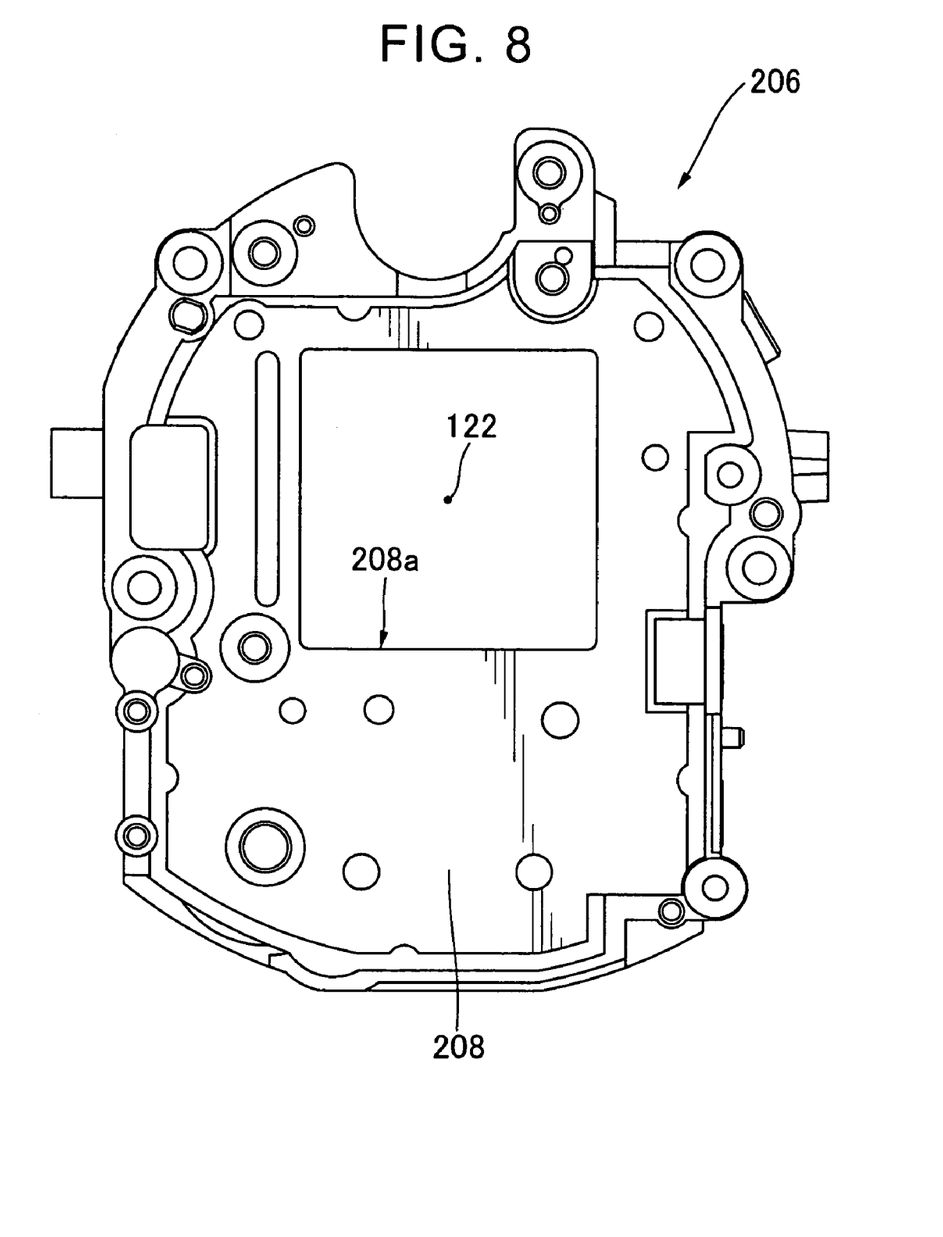
FIG. 8 is a front view of the rearward barrel shown in FIG. 7.
Figure 9:
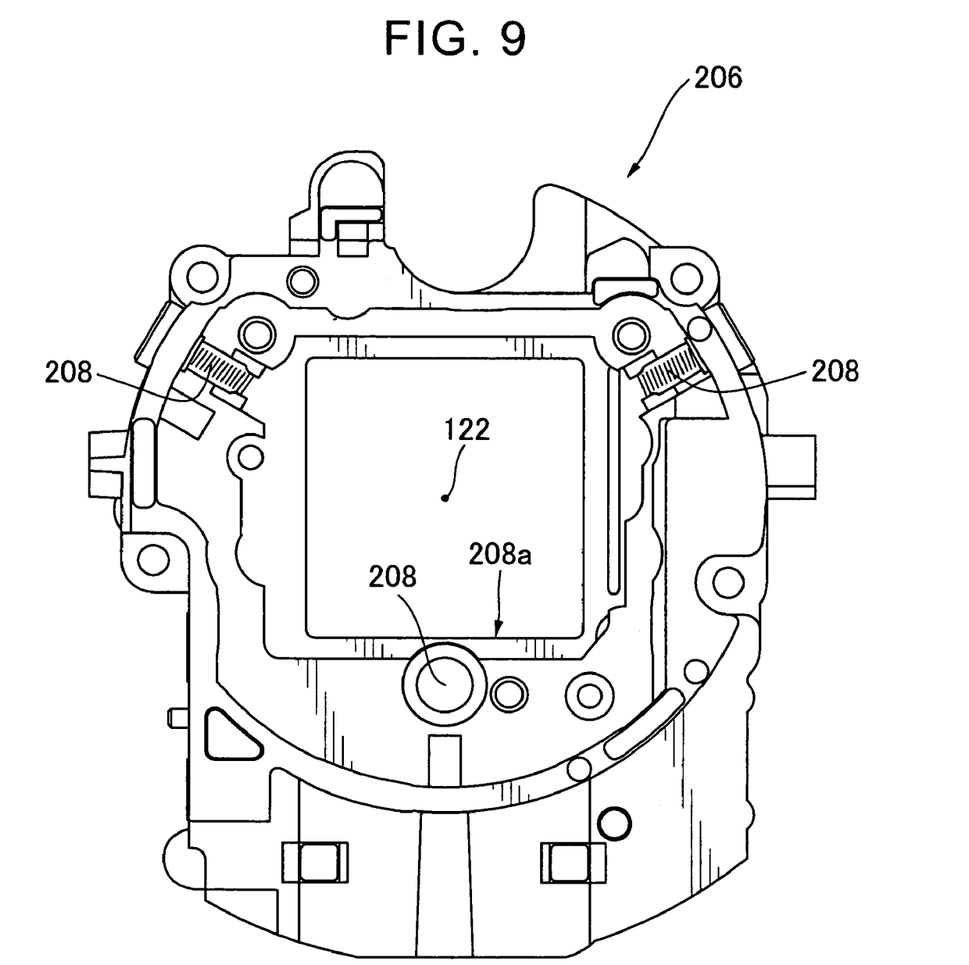
FIG. 9 is a rear view of the rearward barrel shown in FIGS. 7 and 8.

Referring to FIGS. 7 to 9, the rearward barrel 206 uses a barrel insert 208 as a base, and is made by outsert molding an engineering plastic such as polycarbonate. The thickness of the barrel insert 208 may preferably be equal to, for example, 1 mm, taking the strength or the like into consideration. The barrel insert 208 includes a rectangular opening 208a formed therethrough which permits the passage of the light beam from the subject. Referring to FIG. 5, the steel ball 218 is adapted to be brought into contact with the barrel insert 208.

Figure 13:
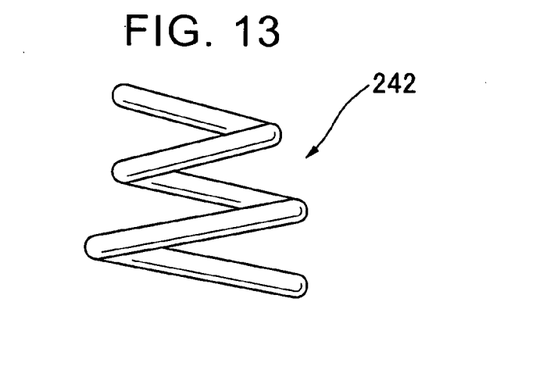
FIG. 13 is a side view of the mount pressing spring.

Referring to FIG. 6, the CCD circuit board 232 is fixedly threadedly attached to the mount 202 by means of circuit-board screws 236 after the CCD sensor 130 and support plate 230 are mounted on the CCD circuit board 232. Referring to FIG. 4, when the CCD circuit board 232 is to be fixedly mounted on the mount 202, the former is guided by guide pins 202f, 202g in the mount 202. The circuit-board screws 236 are passed into pilot holes 220c and 220d in the mount 202 by self-tapping. The mount 202 is fixedly mounted on the barrel insert 208 by passing mount screws 240 into tapped holes in the barrel insert 208. Referring to FIG. 6, a mount pressing spring 242 is disposed between the underside of the head in each of the mount screws 240 and each bearing surface in the rearward barrel 206. Referring to FIG. 13, each of the mount pressing springs 242 is in the form of a coil spring. Each of the mount pressing springs 242 serves as a resilient member for urging the mount 202 against the taking lens barrel (i.e., the rearward barrel 206). The first mount pressing spring 242 is preferably disposed close to the steel ball 218. The second mount pressing spring 242 is preferably disposed close to the adjusting screw 220. It is also preferred that the third mount pressing spring 242 is located close to the adjusting screw 222. While the embodiment of the present invention shown in FIG. 4 utilizes three mount screws 240 and three mount pressing springs 242, they may be four or more in number, respectively. In such an arrangement, the image pickup apparatus such as a camera can hold the CCD sensor 130 with increased reliability.

Figure 10:
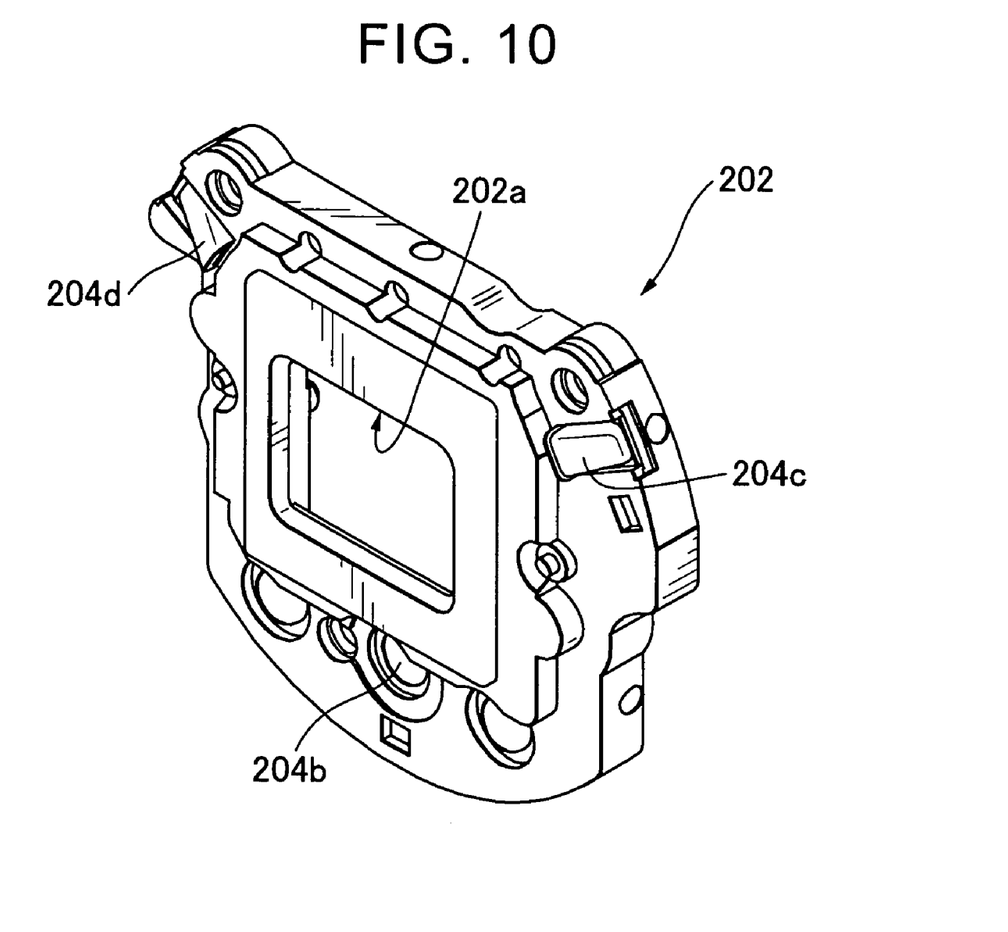
FIG. 10 is a perspective view of a mount in the camera according to the embodiment of the present invention.
Figure 11:
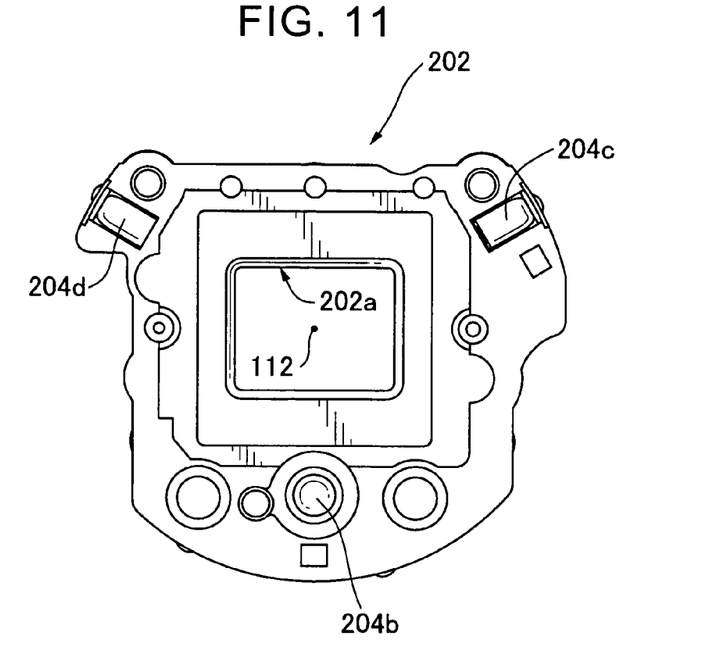
FIG. 11 is a front view of the mount shown in FIG. 10.
Figure 12:
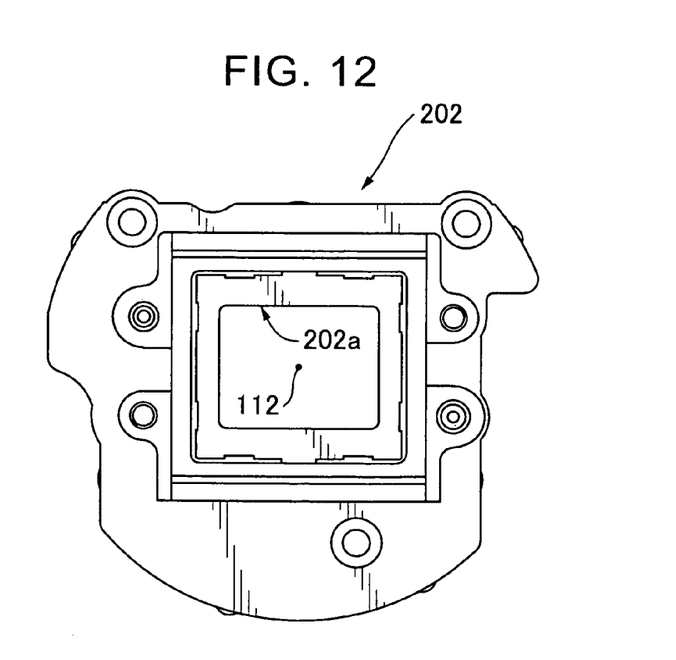
FIG. 12 is a rear view of the mount shown in FIGS. 10 and 11.

Referring to FIGS. 10 to 12, the mount 202 uses a mount insert 204 as a base, and is made by insert molding an engineering plastic such as polycarbonate. The thickness of the mount insert 204 may preferably be equal to, for example, 0.6 mm. The mount 202 includes a rectangular opening 202a formed therethrough which permits the passage of the light beam from the subject. The mount insert 204 is formed with a steel ball contact portion 204b which is brought into contact with the steel ball 218. The steel ball contact portion 204b can be internally formed into a spherical shape complementary to the outline of the steel ball 218. By providing and arranging the steel ball contact portion 204b to the outline of the steel ball 218, the reference position of the mount 202 relative to the rearward barrel 206 can positively be determined with respect to all three-dimensional directions.

The mount insert 204 can be formed with a first adjusting slope or inclined surface 204c to be brought into contact with the moving member or first adjusting screw 220. The mount insert can also be formed with a second adjusting slope 204d to be brought into contact with the second adjusting screw 222. The inclination of each of the adjusting slopes 204c, 204d is selected so that a portion of the adjusting slope close to the optical axis 122 is located close to the backside of the barrel insert 208 while another portion of the adjusting slope spaced apart from the optical axis 122 is positioned away from the backside of the barrel insert 208. An angle DP formed between the adjusting slope 204c and the backside of the barrel insert 208 is equal to, for example, 18.5 degrees. The angle DP is preferably in the range of 5 degrees to 45 degrees and more preferably between 10 degrees and 30 degrees. An angle DP formed between the adjusting slope 204d and the backside of the barrel insert 208 is equal to, for example, 18.5 degrees. The angle DP is preferably in the range of 5 degrees to 45 degrees and more preferably between 10 degrees and 30 degrees.

Referring to FIG. 4, the threaded adjuster member 220 is movable along a central axis 220X. The threaded adjuster member 222 is movable along a central axis 222X. The movable adjuster means of the mount adjusting mechanism can comprises the threaded adjuster members 220, 222. The central axis 222X is oriented non-parallel to the optical axis 122. The central axis 220X is oriented non-parallel to the optical axis 122. The central axis 220X is preferably positioned to intersect the optical axis 122. It is also preferred that the central axis 222X is arranged to intersect the optical axis 122. While the embodiment of the present invention shown in FIG. 4 has been described with respect to two threaded adjuster members 220, 222, the number of threaded adjuster members may be three or more.

Figure 14:
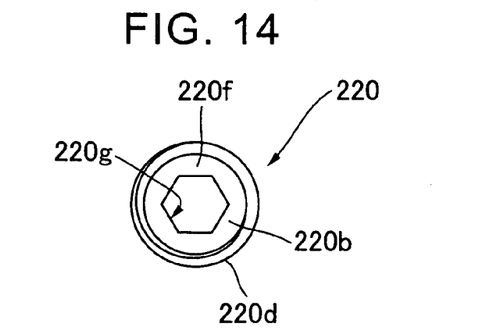
FIG. 14 is a top plan view of an adjusting screw in the camera according to the embodiment of the present invention.
Figure 15:
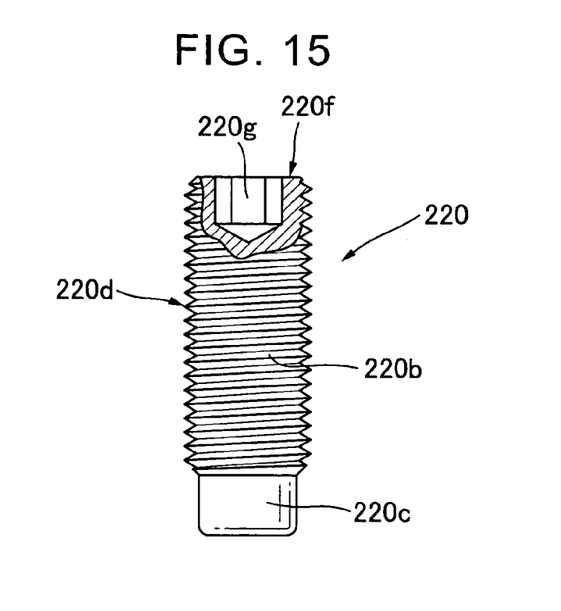
FIG. 15 is a side view of the adjusting screw shown in FIG. 14.

Referring to FIGS. 14 and 15, the threaded adjuster member 220 includes a main body 220b and a tip shank 220c. The main body 220b includes an external thread 220d formed thereon around the entire outer periphery thereof. In other words, the main body 220b serves as a "continuous thread screw". The main body 220b also includes a hexagonal hole 220g formed in the top end 220f thereof. The threaded adjuster members 220, 222 are threaded into the tapped holes in the rearward barrel 206, respectively. When a hexagon wrench is engaged in the hexagonal hole 220g and then rotated, the threaded adjuster member 220 may be threaded into or unthreaded from the tapped hole of the rearward barrel 206. The external diameter of the tip shank 220c is configured to be smaller than the root diameter of the external thread 220d. It is preferred that the threaded adjuster member 222 has the same configuration as that of the threaded adjuster member 220. When the threaded adjuster member 220 is threaded into the threaded hole of the rearward barrel 206, the end of the tip shank 220c in the threaded adjuster member 220 is brought into contact with the adjusting slope 204c.

Referring to FIGS. 4 and 5, the angular orientation of the mount insert 204 with respect to the rearward barrel 206 can be changed by changing the depth to which the threaded adjuster member 220 is threaded into the tapped hole of the rearward barrel 206. Similarly, the angular orientation of the mount insert 204 with respect to the rearward barrel 206 can be also changed by changing the depth to which the threaded adjuster member 222 is threaded into the tapped hole of the rearward barrel 206. The axial stroke ST in each of the threaded adjuster members 220, 222 may preferably be in the range of about 2 mm to about 3 mm. In such an arrangement, the threaded adjuster members 220, 222 can be turned without access from the side of eyepiece. Therefore, the tilt of the CCD sensor relative to the optical axis 122 can be adjusted in an extremely easy and simple manner.

Alternatively, the mount insert 204 may be formed with no adjusting slope or inclined surface. In this case, the threaded adjuster member may have its tapered tip shank. In such an arrangement, as the threaded adjuster member is further threaded into the tapped hole, the larger diameter of the tapered tip shank in the threaded adjuster member will be brought into contact with the mount insert 204. Thus, the inclination of the mount insert 204 relative to the rearward barrel 206 can be changed.

Referring to FIG. 5, an angle DL formed between the central axis 220X and the optical axis 122 is preferably in the range of 30 degrees to 150 degrees, more preferably 70 degrees to 110 degrees and most preferably equal to 90 degrees. An angle DL formed between the central axis 222X and the optical axis 122 is preferably in the range of 30 degrees to 150 degrees, more preferably 70 degrees to 110 degrees and most preferably equal to 90 degrees. The angle formed between the central axis 220X and the optical axis 122 is preferably equal to the angle formed between the central axis 222X and the optical axis 122. The tip end face of the threaded adjuster member 220 is configured to be brought into contact with the adjusting slope 204c in the mount insert 204. The tip end face of the threaded adjuster member 222 is configured to be brought into contact with the adjusting slope 204d in the mount insert 204. The lateral face of the threaded adjuster member 220 is configured to be brought into contact with the barrel insert 208. The side face of the threaded adjuster member 222 is configured to be brought into contact with the barrel insert 208.

Preferably, the center points of the tips of the threaded adjuster members 220 and 222 are positioned so as to define an "divergent angle" about the optical axis 122, which is preferably in the range of 30 degrees to 170 degrees, more preferably 90 degrees to 150 degrees and most preferably equal to 120 degrees. The term "divergent angle" herein indicates an angle DK formed between a perpendicular line extending from the center of the tip end of the threaded adjuster member 220 to the optical axis 122 and a perpendicular line extending from the center of the tip end of the threaded adjuster member 222 to the optical axis 122. In such an arrangement, the tilt of the CCD sensor 130 relative to the optical axis 122 can more precisely be adjusted in a stable and positive manner. In such an arrangement of the image pickup apparatus such as the camera 100, furthermore, the tilt of the CCD sensor 130 relative to the optical axis 122 can be adjusted more easily and simply. Referring back to FIG. 1, the mount adjustment mechanism 200 including the CCD sensor 130 is disposed rearwardmost of the taking lens barrel.

(3) Configuration of Electronic Camera Circuit

Figure 16:
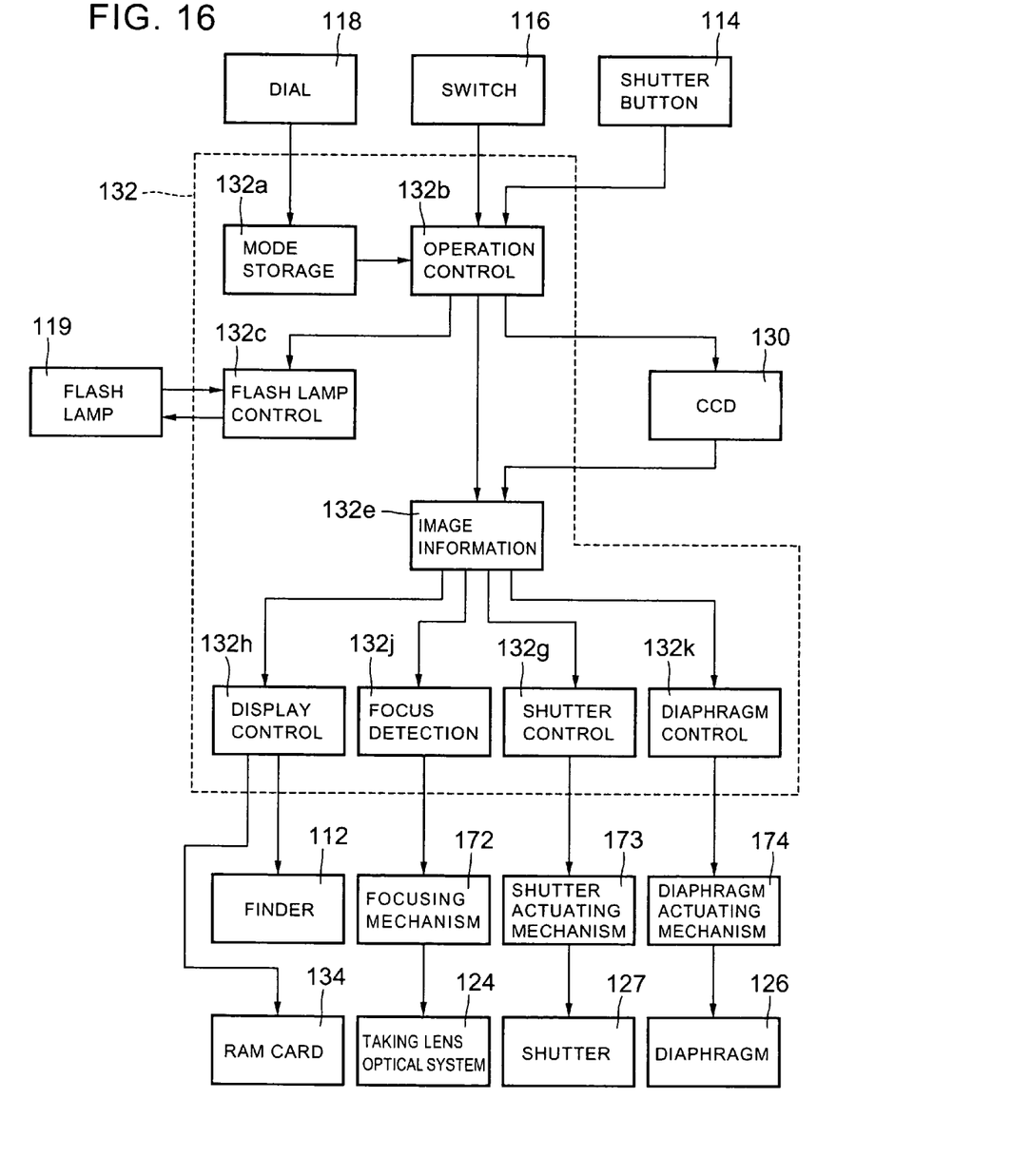
FIG. 16 is block diagram of a control circuit in the camera according to the embodiment of the present invention.

The configuration of an electronic circuit in the camera 100 according to the present invention will be described below. Referring to FIG. 16, the IC 132 comprises a mode storage section 132a for storing a mode set by a dial 118, an operation control section 132b for controlling the operation of the camera 100 on the actuation of the switch 116 and shutter button 114, a flash lamp control section 132c for controlling flash light from the flash lamp 119 based on a signal outputted by the operation control section 132b, an image information processing section 132e for processing information relating to an image formed by the light beam from the subject, based on a signal outputted from the CCD sensor 130 which has been actuated by the signal from the operation control section 132b, a shutter control section 132g for outputting a signal to the shutter actuating mechanism 173 to control the actuation of the shutter 127 based on the signal which is outputted by the image information processing section 132e, a display control section 132h for controlling indication based on the signal which is outputted by the image information processing section 132e, a focus detection control section 132j for outputting a signal to the focusing mechanism 172 to focus the image defined by the light beam from the subject onto a focal plane, based on the signal outputted by the image information processing section 132e, and a diaphragm control section 132k for outputting a signal to the diaphragm actuating mechanism 174 to control the actuation of the diaphragm 126 based on the signal outputted by the image information processing section 132e.

The operation control section 132b, flash lamp control section 132c, image information processing section 132e, shutter control section 132g, display control section 132h, focus detection control section 132j and diaphragm control section 132k may preferably be installed in the IC 132 as computer software. In other words, it is preferred that the respective operations and procedures of the operation control section 132b, flash lamp control section 132c, image information processing section 132e, shutter control section 132g, display control section 132h, focus detection control section 132j and diaphragm control section 132k are prepared into a program as computer software, such a program being then provided into the IC 132. In such an arrangement, the IC 132 is preferably in the form of a PLA-IC.

Modes settable by the dial 118 may include, for example, a mode for setting whether or not the flash lamp 119 is actuated; a manual mode for manually setting the exposure (i.e., a so-called M mode); a mode for setting whether or not the diaphragm is to be made preferential (i.e., a so-called AV mode); a mode for setting whether or not the shutter speed is to be made preferential (i.e., a so-called TV mode); a program mode (i.e., a so-called P mode); an automatic focusing mode for automatically adjusting the focus (i.e., a so-called AF mode); a manual focusing mode (i.e., a so-called MF mode); a mode for determining whether the image storage medium is a RAM card or other storage medium and other modes.

(4) Adjustment of Mount Adjustment Mechanism

Operation of the mount adjustment mechanism 200 according to the embodiment of the present invention will be described below in conjunction with the adjustment of the mount. Referring to FIG. 1 and FIGS. 4 to 6, the measuring terminals in the CCD circuit board 232 of the mount adjustment mechanism 200 are first connected to an image measuring device (not shown). Then, a test chart is taken by the camera 100. A light beam from the pattern in the test chart is received by the CCD sensor 130. A signal relating to the pattern of the test chart which has been received by the CCD sensor 130 is inputted into the image measuring device through the measuring terminals in the CCD circuit board 232. An operator then turns the threaded adjuster member 220 and 222 using the hexagon wrench while viewing the data inputted into the image measuring device. When the threaded adjuster member 220 and 222 are turned, the angular orientation of the mount insert 204 with respect to the rearward barrel 206 can be changed. Thus, the operator can set an appropriate angular orientation of the mount insert 204 with respect to the rearward barrel 206 while viewing the data inputted into the image measuring device. Due to the fact that in the camera according to the present invention the mount adjustment mechanism can be adjusted by turning the threaded adjuster members 220 and 222 through access from a direction perpendicular to the optical axis, the manufacturing/adjusting process in the image pickup apparatus can be simplified.

(5) Operation of Camera

The operation of the camera 100 according to the embodiment of the present invention will now be described. Referring to FIGS. 1 to 3 and FIG. 16, the dial 118 is first manipulated to set a desired operation mode in the camera 100. For example, the dial 118 may be manipulated to set an operation mode in which the flash lamp 119 will not be lighted; the exposure being performed in the program mode; the focusing being automatically executed; and the image being recorded in the RAM card 134. The mode set as described is then stored in the mode storage section 132*a*. On actuation of the switch 116, the CCD sensor 130 is actuated to receive the light beam from the subject by the signal outputted from the operation control section 132*b*. The image information processing section 132*e* then processes information relating to the image defined by the light beam from the subject, based on the signal outputted by the CCD sensor 130. The display control section 132*h* controls the contents of display based on the signal outputted by the image information processing section 132*e*. The image defined by the light beam from the subject is displayed on the finder 112 based on the signal outputted from the display control section 132*h*.

When the shutter button 114 is depressed through half-stroke, the focus detection control section 132*j* receives the signal outputted from the image information processing section 132*e* and provides, based on the signal, a signal to the focusing mechanism 172 to focus the image formed by the light beam from the subject onto a focal plane. In such a manner, the focus detection control section 132*j* can control the operation of the focusing mechanism 172 by using such a signal. The focusing mechanism 172 moves part or the whole of the lenses in the taking-lens optical system 124 to focus the image defined by the light beam from the subject. The shutter control section 132*g* and diaphragm control section 132*k* respectively compute appropriate values of shutter speed and diaphragm stop which have been previously predetermined according to the program, based on the signal outputted by the image information processing section 132*e*.

When the shutter button 114 is depressed through full-stroke, the diaphragm control section 132*k* receives the signal from the image information processing section 132*e* and provides, based on the signal, a signal to the diaphragm actuating mechanism 174 to actuate the diaphragm 126, so that the diaphragm 126 can be actuated to provide the computed diaphragm stop. The shutter control section 132*g* receives the signal from the image information processing section 132*e* and provides a signal to the shutter actuating mechanism 173 to actuate the shutter 127 at the computed shutter speed. The display control section 132*h* records the image defined by the light beam from the subject into the RAM card 134 with that shutter speed.

INDUSTRIAL APPLICABILITY

The present invention can be applied to image pickup apparatuses such as digital cameras, monitor cameras and image readers.

LIST OF REFERENCE NUMERALS

100 camera
110 camera body
120 image taking lens
122 optical axis
124 taking-lens optical system
126 diaphragm
127 shutter
130 CCD sensor
200 mount adjustment mechanism
202 mount
204 mount insert
206 rearward barrel
208 barrel insert
218 steel ball
220 threaded adjuster member
222 threaded adjuster member
230 support plate
232 CCD circuit board
236 circuit-board screw
242 mount pressing spring

What is claimed is:

1. An image pickup apparatus for pickup of an image of a subject comprising:
   a taking lens system for focusing a light beam from a subject;
   a taking lens barrel for supporting the taking lens system therein;
   an image sensor for receiving an image defined by the focused light beam passing through the taking lens stem;
   a mount for supporting said image sensor; and
   a mount adjustment mechanism for adjusting an inclination of said mount in order to change an angular orientation of said image sensor with respect to an optical axis of said taking lens system,
   said mount adjustment mechanism comprising:
   a mount reference for positioning said mount in a direction parallel to said optical axis, and
   a threaded adjuster member disposed between said mount and said taking lens barrel and movable along a central axis which is not parallel to said optical axis,
   wherein the angular orientation of said mount with respect to said taking lens barrel is changeable by rotating said threaded adjuster member, and
   wherein said threaded adjuster member comprises two separate threaded members each of which is configured to be movable along its central axis perpendicular to said optical axis and said two threaded members are lengthwise disposed to define a divergent angle about said optical axis, said divergent angle being in the range of 90 degrees to 150 degrees.

2. An image pickup apparatus for pickup of an image of a subject comprising:
   a taking lens optical system for focusing a light beam from a subject;
   a taking lens barrel for supporting the taking lens optical system therein;
   an image sensor for receiving an image defined by the focused light beam passing through the taking lens optical system;
   a mount for supporting said image sensor; and
   a mount adjustment mechanism for adjusting an inclination of said mount in order to change an angular orientation of said image sensor with respect to an optical axis of said taking lens optical system, said mount adjustment mechanism comprising:
   a mount reference for positioning said mount in a direction parallel to said optical axis and
   adjuster screws disposed between said mount and said taking lens barrel, wherein said adjuster screws is movable along a central axis which intersects to said optical axis,
   wherein the mount uses a mount insert as a base, and is made by insert molding an engineering plastic,
   the mount insert is formed with adjusting slopes to be brought into contact with said adjusting screw,
   the taking lens barrel uses a barrel insert as a base, and is made by outsert molding an engineering plastic, and the side face of said adjusting screw is configured to be brought into contact with said barrel insert, wherein the angle formed between said adjusting slope and the backside of said barrel insert is in the range of 5 degrees to 45 degrees.

3. An image pickup apparatus for pickup of an image of a subject, comprising:

- a taking lens optical system for focusing a light beam from a subject;
- a taking lens barrel for supporting the taking lens optical system therein;
- an image sensor for receiving an image defined by the focused light beam passing through the taking lens optical system;
- a mount for supporting said image sensor; and
- a mount adjustment mechanism for adjusting an inclination of said mount in order to change an angular orientation of said image sensor with respect to an optical axis of said taking lens optical system, said mount adjustment mechanism comprising:
  - a mount reference for positioning said mount in a direction parallel to said optical axis and
  - adjuster screws disposed between said mount and said taking lens barrel, wherein said adjuster screws is movable along a central axis which intersects to said optical axis, wherein the mount uses a mount insert as a base, and is made by insert molding an engineering plastic, the mount insert is formed with adjusting slopes to be brought into contact with said adjusting screw, the taking lens barrel uses a barrel insert as a base, and is made by outsert molding an engineering plastic, and the side face of said adjusting screw is configured to be brought into contact with said barrel insert, wherein said adjuster screws comprises two separate threaded members each of which is configured to be movable along its central axis perpendicular to said optical axis and said two threaded members are lengthwise disposed to define a divergent angle about said optical axis, said divergent angle being in the range of 90 degrees to 150 degrees.

* * * * *